ical acids employing heavy metal oxidation catalysts in combination with compounds yielding bromine ions under the reaction conditions is known in the art and has proved to be a valuable tool for the provision of industrial acids. One of the difficulties with such prior art oxidation procedures lies in their inability to provide an essentially pure product without expensive and time-consuming separation procedures. Moreover, where polyalkyl derivatives are employed as reactants the reaction sometimes appears to proceed with the oxidation of one of the alkyl radicals to the exclusion of the remainder. Such by-products frequently tend to possess solubility properties similar to those possessed by the desired product making separation and purification of the desired product expensive and time-consuming in commercial operations. A further difficulty encountered in such reactions involving intermediate oxidation products resides in the fact that conditions and catalyst materials which function most efficiently at one stage of the reaction become less efficient for oxidation at another intermediate stage.

United States Patent Office 3,453,324
Patented July 1, 1969

3,453,324
PREPARATION OF AROMATIC ACIDS FROM HYDROXYMETHYLAROMATICS
Hartwig C. Bach, Durham, N.C., assignor to Monsanto Company, St. Louis, Mo., a corporation of Delaware
No Drawing. Filed Jan. 3, 1966, Ser. No. 517,904
Int. Cl. C07c 63/14, 65/04
U.S. Cl. 260—520      8 Claims

ABSTRACT OF THE DISCLOSURE

High yields of highly pure 4,4'-dicarboxy-diphenyl-ether have been prepared from 4,4'-bis(hydroxymethyl)-diphenyl ether employing a specific catalyst system of cobalt and bromine in concentrations which provide at least about one atom of cobalt for every atom of bromine in a lower fatty acid solvent.

This invention relates to a novel method for the oxidation of 4,4'-bis(hydroxymethyl)-diphenylether to form 4,4'-dicarboxy-diphenylether.

The oxidation of alkylaromatic compounds to form the corresponding carboxylic acids employing heavy metal oxidation catalysts in combination with compounds yielding bromine ions under the reaction conditions is known in the art and has proved to be a valuable tool for the provision of industrial acids. One of the difficulties with such prior art oxidation procedures lies in their inability to provide an essentially pure product without expensive and time-consuming separation procedures. Moreover, where polyalkyl derivatives are employed as reactants the reaction sometimes appears to proceed with the oxidation of one of the alkyl radicals to the exclusion of the remainder. Such by-products frequently tend to possess solubility properties similar to those possessed by the desired product making separation and purification of the desired product expensive and time-consuming in commercial operations. A further difficulty encountered in such reactions involving intermediate oxidation products resides in the fact that conditions and catalyst materials which function most efficiently at one stage of the reaction become less efficient for oxidation at another intermediate stage.

This invention has an object to provide a process for the manufacture of 4,4'-dicarboxy-diphenylether in nearly quantitative yields.

Another object of the invention lies in the provision of 4,4'-dicarboxy-diphenylether in highly pure form with the aid of a specific catalyst system within limitated reaction conditions such that water is essentially the only reaction by-product.

A further object of this invention is to provide a continuous process for the manufacture of essentially pure 4,4'-dicarboxy-diphenylether.

These and other objects of the instant invention are provided by the oxidation of 4,4'-bis(hydroxymethyl)-diphenylether dissolved in a normally liquid fatty acid with molecular oxygen at temperatures of from room temperature to the reflux temperature of the reaction mixture in the presence of a catalyst consisting essentially of a cobalt salt of a normally liquid fatty acid and a bromide ion under essentially anhydrous conditions.

Because of the unusual cleanness of the instant oxidation it is believed that the above recited reaction conditions convert the reactant diol directly to the dicarboxylic acid without formation of stable intermediates. This invention provides not only for extremely high meaningful use of reactant materials, but also eliminates the necessity for troublesome separation and clean-up procedures commonly associated with aromatic acid formation through oxidation of alkyl aromatic compounds.

In carrying out the process of this invention the reactants and catalyst are dissolved in a normally liquid fatty acid reaction medium. Preferably, the reaction medium is glacial acetic or propionic acid. The amount of acid used for the reaction medium has not been found to constitute a critical aspect of this invention as long as substantial dissolution of the reactant diol and catalyst material is maintained.

The essential feature of the catalyst system employed for the oxidation of 4,4'-bis(hydroxymethyl)-diphenylether is that it be composed of cobalt and bromine in concentrations which provide at least about one atom of cobalt for every atom of bromine present in the system in combination with the lower fatty acid. The presence of an excess of monoatomic bromine rapidly retards and will actually stop the reaction as the excess approaches 100 percent. On the other hand, a considerable excess of cobalt may be efficiently employed without severe retardation of the reaction rates. For example, excesses of cobalt up to 300 percent and higher provide efficient reaction rates. However, it is desirable to maintain an excess of cobalt atoms less than about 100 percent. The cobalt component of the catalyst system is preferably charged to the reaction system in a form which does not require the addition of foreign or unnecessary materials. Thus, cobalt is preferably added in the form of the salt of the lower fatty acid used as the reaction medium or as cobaltous bromide. Notwithstanding the desirability of maintaining the system free from unnecessary ions, other forms of cobalt such as salts of aromatic acids can be used. Anions such as sulfate, iodide, chlorate and others tend to retard catalyst activity and should be avoided. Insofar as acetic acid is the preferred reaction medium for the specific oxidation of this invention, cobaltous acetate tetrahydrate is the preferred source of cobalt.

Consonant with the preferred practice according to this invention whereby foreign or unnecessary materials are desirably avoided, the preferred source of bromine is hydrogen bromide. Elemental bromine and cobalt salts of bromine are also quite effective. Similarly, organic compounds such as bromoacetic acid and bromochloroform provide a source for bromine in the reaction system but their use provides no advantage over hydrogen bromide. Optimum conditions for the particular reaction involved in the invention are believed to be provided through the use of molar ratios of cobaltous acetate tetrahydrate and hydrogen bromide ranging from 1:1 to 2:1.

The oxidizing agent employed according to this invention is elemental oxygen. Oxygen may be fed to the system as pure oxygen, oxygen diluted with an inert gas, such as nitrogen or helium, air or oxygen enriched air. Economy of operation will generately dictate the use of air in large scale manufacturing operations.

A required feature of the instant process is that the reaction system be maintained under essentially anhydrous conditions. By this it is meant that concentrations of water should be maintained at below about 5 percent by weight of the reaction mass and preferably below about 1 percent by weight of the mass. When the process of the instant invention is conducted at or near reflux the accumulation of water poses no particular problem because it is distilled from the system as the reaction progresses. Otherwise, water may be effectively maintained at low operating levels by addition of acetic anhydride.

While reaction appears to occur at temperatures as low as 25° C. the acid formation occurs much more rapidly according to this invention at temperatures ranging from about 90° C., to the reflux of the reaction mass. At the preferred operating temperatures the reaction not only proceeds at a greater rate, but removal of water is thereby facilitated as above indicated. No particular advantage is realized through the use of pressure above or below atmospheric. Accordingly, reaction at atmospheric conditions is preferred.

In carrying out the reaction the reactant diol and catalyst components are dissolved in a suitable reactor containing means for agitating the reaction mass and means for passing the oxidizing agent into the mass. The temperature is then elevated to allow reaction to set in, preferably to slightly below reflux temperature. The order of adding reactants, solvent and catalyst components has not been found critical and, accordingly, they may be separately charged or they may be charged to the reactor in convenient combinations. The oxidizing agent may be passed in after dissolution of the charged materials and upon elevation of the temperature to the reaction range. The reaction may be conducted in an open or closed vessel, preferably glass or titanium lined, such that corrosion does not deposit impurities in the system.

The specific reaction of this invention may be conducted as a batch, semi-batch or continuous process. Insofar as 4,4'-dicarboxy-diphenylether is quite insoluble in the reaction mass and precipitates as a white solid of substantial particle size, the process of the invention is admirably suited for, and operated as, a continuous process.

In continuous operations the precipitated acid may be continuously or intermittently removed and the filtrate recycled without treatment. When operating under preferred conditions where no foreign or unnecessary materials or radicals are employed, the reaction can be conducted for extended periods without necessity for shutdown and clean-up of the system. The contribution of reactant diol to impurity build-up and by-product formation is negligible even after lengthy periods of operation. Care is maintained to insure proper balance of catalyst component, supply of reactant materials and removal of water of reaction during the continued course of reaction. In cases where water is continuously or intermittently distilled from the reaction mixture particular care should be observed to maintain the requisite concentration of bromide in the system.

The following examples illustrate the invention.

EXAMPLE I

The reaction was conducted in a closed system connected to an oxygen buret. Oxygen at atmospheric pressure was used as the gas phase. Readings of the gas buret were taken at the start, during the reaction, and at the end of the reaction. First and last readings were taken at room temperature, their difference plus any volume of oxygen added during the reaction being the total amount of $O_2$ absorbed.

The reaction mixture was prepared by dissolving cobalt acetate·$4H_2O$ in the acid used, adding a solution of HBr in glacial acetic acid and some starting material. The mixture was slowly heated to reaction temperature and a solution of the starting material in the acid used was added dropwise as the oxidation progressed. The acids prepared were isolated in pure form by filtration of the reaction mixture after oxidation was complete.

4,4'-bis(hydroxymethyl)-diphenylether (8.05 g.) was oxidized in a mixture of 1.73 g. of cobalt acetate·$4H_2O$, 1.54 ml. of acetic acid containing 0.1813 g. of HBr/ml. and 125 ml. of glacial acetic acid. Oxidation started at 55° C. in 5½ hrs. at 91–99° C. a total of 1740 ml. $O_2$ was absorbed (theory: 1710 ml.). By filtration, 8.22 g. of 4,4' - dicarboxydiphenylether, M.P.=325–327° C., were obtained; yield: 91.1% of theory. No organic by-products were detected.

EXAMPLE II 4,4'-bis(hydroxymethyl)-diphenylether (8.05 g.) was oxidized at 80–87° C. in 275 min. in a mixture of 1.73 g. of cobalt acetate·$4H_2O$, 1.54 ml. of acetic acid containing 0.1813 g. of HBr/ml. and 125 ml. of propionic acid. By filtration, 8.27 g. of 4,4'-dicarboxydiphenylether, M.P.=327–328° C., were obtained; yield: 91.6% of theory. No organic by-products were detected.

EXAMPLE III

This example shows that the reaction can be conducted as a continuous process by removal of water formed in the reaction, filtration of the product and recycling of the filtrate containing the catalyst.

4,4'-bis(hydroxymethyl)-diphenylether (16.1 g.) was oxidized in a mixture of 3.46 g. of cobalt acetate·$4H_2O$, 3.08 ml. of acetic acid containing 0.1813 g. of HBr per ml., and 200 ml. of acetic acid. Temperature was kept at 94–100° C. for 4½ hrs., then raised to 109–112° C. for 1½ hrs. 60 ml. of liquid containing 3.3% $H_2O$ were distilled off at this temperature. 3190 ml. of oxygen were absorbed. The acid produced (13.8.), M.P.=325–335° C., was filtered off.

Acetic acid (0.5 ml.) containing 0.1813 g. HBr/ml. was added to the filtrate. Another 16.1 g. of 4,4'-bis(hydroxymethyl)-diphenylether were oxidized in this mixture (100 ml. of acetic acid being used as a solvent for the starting material). 9.4 g. of 4,4'-dicarboxydiphenylether, M.P.=328–336° C., were obtained.

I claim:

1. A process for the preparation of 4,4'-dicarboxy-diphenylether which comprises passing molecular oxygen into an essentially anhydrous solution of 4,4'-bis(hydroxymethyl)diphenylether dissolved in a normally liquid fatty acid containing a catalyst consisting essentially of a cobalt salt of a normally liquid fatty acid and bromide ions such that there is at least one atom of cobalt for each atom of bromine in said solution.

2. The process of claim 1 wherein the temperature of the solution ranges from 25° C. to reflux temperature of the solution.

3. The process of claim 1 wherein acetic acid is the solvent and the temperature ranges from 90° C. to reflux temperature of the solution.

4. The process of claim 1 wherein the catalyst is provided by cobalt acetate tetrahydrate and hydrogen bromide.

5. A continuous process for the preparation of 4,4'-dicarboxydiphenylether which comprises passing molecular oxygen into an essentially anhydrous normally liquid fatty acid solution containing 4,4' - bis(hydroxymethyl) - diphenylether and a catalyst consisting essentially of cobalt as a cobalt salt of a normally liquid fatty acid and bromine as bromide ions such that there is at least one atom of cobalt for every atom of bromine, filtering off precipitated 4,4' - dicarboxydiphenylether during the course of the reaction and recycling the filtrate to said solution, adding 4,4'-bis(hydroxymethyl)-diphenylether, normally liquid fatty acid and said catalyst to the system to maintain essentially constant concentrations in the said solution and maintaining essentially anhydrous conditions during the course of the reaction by removal of water of reaction.

6. The process of claim 5 wherein the solution is maintained at temperatures between 25° C. and the reflux temperature of the solution.

7. The process of claim 5 wherein the normally liquid fatty acid is acetic acid and the temperature of the solution is maintained between about 90° C. and the reflux temperature of the solution.

8. The process of claim 7 wherein the bromide ion is supplied to the solution as hydrogen bromide and the cobalt salt is cobalt acetate tetrahydrate.

References Cited

UNITED STATES PATENTS

| | | | |
|---|---|---|---|
| 3,012,038 | 12/1961 | O'Neil et al. | 260—533 X |
| 2,959,613 | 11/1960 | Whitfield | 260—521 X |
| 3,194,794 | 7/1965 | Caldwell et al. | |

OTHER REFERENCES

Barbor et al., "Introductory College Chemistry," 2nd ed., Crowell, N.Y., 1950, pp. 407–08.

Morrison et al., "Organic Chemistry," Allyn & Bacon, Boston, 1965, p. 418.

JAMES A. PATTEN, *Primary Examiner.*

D. STENZEL, *Assistant Examiner.*